United States Patent
Chen et al.

(10) Patent No.: US 8,618,434 B2
(45) Date of Patent: Dec. 31, 2013

(54) SUPERALLOY REPAIR WELDING USING MULTIPLE ALLOY POWDERS

(75) Inventors: Zheng Chen, Kitchener (CA); Ovidiu Timotin, Hamilton (CA)

(73) Assignee: Siemens Energy, Inc., Orlando, FL (US)

( * ) Notice: Subject to any disclaimer, the term of this patent is extended or adjusted under 35 U.S.C. 154(b) by 609 days.

(21) Appl. No.: 12/728,353

(22) Filed: Mar. 22, 2010

(65) Prior Publication Data

US 2011/0226390 A1    Sep. 22, 2011

(51) Int. Cl.
  *B23K 9/04*  (2006.01)
  *B23K 31/02* (2006.01)

(52) U.S. Cl.
  USPC ........................ 219/76.14; 228/256

(58) Field of Classification Search
  USPC ............... 29/889.1; 219/76.14; 228/256
  See application file for complete search history.

(56) References Cited

U.S. PATENT DOCUMENTS

| | | |
|---|---|---|
| 4,336,312 A | 6/1982 | Clark et al. |
| 5,106,010 A | 4/1992 | Stueber et al. |
| 5,702,660 A | 12/1997 | Allott et al. |
| 5,833,126 A * | 11/1998 | Wark et al. ............. 228/7 |
| 5,900,170 A | 5/1999 | Marcin, Jr. et al. |
| 5,914,059 A | 6/1999 | Marcin et al. |
| 5,972,269 A | 10/1999 | Barros et al. |
| 6,024,792 A | 2/2000 | Kurz et al. |
| 6,037,563 A | 3/2000 | Foster et al. |
| 6,103,402 A | 8/2000 | Marcin, Jr. et al. |
| 6,364,971 B1 | 4/2002 | Peterson, Jr. et al. |
| 6,547,210 B1 | 4/2003 | Marx et al. |
| 6,872,912 B1 | 3/2005 | Wos et al. |
| 7,343,676 B2 | 3/2008 | Ng |
| 2003/0173720 A1 | 9/2003 | Musso et al. |
| 2004/0112280 A1 * | 6/2004 | Beck et al. ............ 117/84 |
| 2005/0263220 A1 * | 12/2005 | Malley et al. ........ 148/529 |
| 2006/0085009 A1 | 4/2006 | Truckai et al. |
| 2008/0210347 A1 | 9/2008 | Morin et al. |

* cited by examiner

Primary Examiner — Keith Walker
Assistant Examiner — Alexander Polyansky

(57) ABSTRACT

A method of welding a gas turbine engine substrate composed of a gamma prime precipitation strengthened nickel based superalloy, including the steps of: applying weld beads on the substrate to form a continuous layer the thickness of the weld beads; using a filler material made of a first material exhibiting comparable strength and ductility as the substrate, and a second material exhibiting greater ductility than the substrate; and creating crack propagation mitigating regions within the continuous layer by increasing the percentage of the second material in the crack propagation mitigating regions over the percentage of the second material in the remainder of the continuous layer.

27 Claims, 4 Drawing Sheets

SUPERALLOY REPAIR WELDING USING MULTIPLE ALLOY POWDERS

FIELD OF THE INVENTION

This invention relates to a method of welding and repair of superalloy substrates such as gas turbine blades. In particular, this invention relates to creating a weld build-up at room temperature that is crack resistant, while retaining mechanical properties similar to that of the superalloy substrate.

BACKGROUND OF THE INVENTION

High strength gamma-prime-strengthened nickel based superalloys used in gas turbine hot sections are generally described as those which have high strength even at temperatures of 1600 degrees Fahrenheit or higher. Generally, in order to restore both dimension and geometry of damaged hot section components such as turbine blades and nozzle guide vanes and maintain elevated temperature properties (both environmental resistant and creep resistant properties etc), advanced superalloy filler materials are laser deposited onto worn or damaged areas of components. Thus, damaged advanced turbine superalloy (including directionally solidified and single crystal cast) components are completely repaired and restored to their original geometry and dimension with excellent elevated temperature properties.

Advanced nickel-based superalloys with high volume fraction of gamma prime precipitates, (i.e. gamma-prime-strengthened nickel based superalloys) such as INCONEL® 738 manufactured by Special Metals Company, René® 80, manufactured by Reade Advanced Materials, and CM-247 manufactured by The C-M Group, as well as single crystal or directionally solidified (DS) superalloys, are susceptible to cracking in both the heat affected zone and in weld beads resulting from welding using filler alloy having the same or similar composition (i.e. "even-matched") as the base metal (i.e. the substrate). Therefore, many weld repair processes are carried out using conventional solid solution strengthened welding alloys such as INCONEL® 625 manufactured by Special Metals Company, or oxidation resistant high strength Co based weld fillers, which are softer (i.e. "under-matched") than most gamma-prime-strengthened nickel based superalloys, due to the low Al and Ti content. However, the use of under-matched filler is not desirable for component repairs that require considerable strength. Further, the large thermal expansion mismatch between the high strength Co base fillers and the nickel superalloy substrate could produce high thermo-mechanically induced damage and low thermal mechanical fatigue life during service. To extend the repaired component life and to repair the high-stressed region, ideally the weld metal used should have either the same or close composition as the base metal so that the thermal expansion and creep properties of the weld will closely match the base metal. This is particularly attractive for advanced nickel based superalloy components. However, it is very difficult to produce a crack-free weld with nickel based alloy filler with high Al and Ti contents due to segregation as well as solidification shrinkage or thermal contraction or shrinkage strains from gamma prime precipitation.

Several approaches have been taken toward eliminating the cracks in nickel based superalloy weld buildup for component repairs that require considerable strength. U.S. Pat. No. 4,336,312 describes a combination of a controlled chemical modification of a cast nickel-based superalloy material along with a pre-weld thermal conditioning cycle. U.S. Pat. No. 6,364,971 describes a laser welding technique used following a pre-conditioning hot isostatic process. U.S. Pat. No. 633, 484 describes a welding technique wherein the entire weld area is preheated to a maximum ductility temperature range, and this elevated temperature is maintained during the weld and solidification of the weld. These patents are incorporated herein by reference.

Other approaches include 1) laser powder weld build-up while heating the component substrate (see U.S. Pat. Nos. 5,106,010, 6,037,563, 6,024,792, and EP patent 0861927); and using low energy laser beams to re-heat each deposited layer (see U.S. Pat. Nos. 5,900,170, 5,914,059, and 6,103, 402). There patents are incorporated herein by reference. While heating the components during laser powder welding is effective, it is an expensive process, can cause distortion of the component, and has the potential of affecting the microstructure of the superalloy due to incipient melting at the grain boundaries. For example, turbine blades are often repaired using a technique known as hot-box welding. Hot-box weld repairs may take eight hours or more to complete, and the requirement for working inside of the hot box to maintain the elevated temperature makes it difficult to perform such welds robotically.

Techniques have therefore been developed that permit weld build-up at room temperature for component repairs that require considerable strength. US patent application 20080210347, incorporated herein by reference, discloses a method for welding superalloy components at ambient temperature conditions while reducing the propensity of the superalloy material to crack as a result of the weld. A root pass region of the weld is formed using a filler material that exhibits ductility that is higher than that of the base superalloy material. The ductile material mitigates stress in the root region, thereby preventing the formation of cracks. A remaining portion of the weld is formed using a filler material that essentially matches the base superalloy material. However, the amount of "even-matched" filler material build-up is limited to a certain height in order to avoid cracking.

For laser weld repair by deposition there are many different superalloy compositions designed for different applications, and alloy powders and/or alloy wires can be used as the filler materials for component repairs that require considerable strength. However, commercially available superalloy powders or wires are limited in terms of composition and availability. This situation thus largely limits the application of laser welding repair. For example, as noted above, laser depositions at room temperature using INCONEL® 738 powder or wire for repairing INCONEL® 738 blade (i.e. even-matched), or using Mar-M-247®, manufactured by MetalTek, powder or wire for repairing CM-247 blade (even-matched), will in most cases produce significant cracking due to the high contents of Al and/or Ti in the fillers. Therefore, a superalloy composition with reduced Al and Ti contents should be used for repair of INCONEL® 738 and CM-247, preferable at room temperature, for component repairs that require considerable strength. It has been reported that INCONEL® 939, manufactured by Special Metals Company, which contains a much smaller amount of Al compared to INCONEL® 738, could be successfully used in laser welding repair of INCONEL® 738. However, because of the much lower Al content, the resulting weld has a reduced oxidation and corrosion resistance. Further, INCONEL® 939 powder is much more expensive than INCONEL® 738 powder, and is not a commercially available superalloy powder.

U.S. Pat. No. 6,872,912, incorporated herein by reference, discloses an ambient temperature process for almost crack-free welding of a nickel-based single crystal superalloy component containing at least 5 weight percent total of Ti and Al, using a filler alloy which is a composition of nickel based single crystal superalloy, except that the total of Al and Ti is reduced below 5 weight percent. Welds created with this uniformly composed filler material reduce the susceptibility of the weld build-up to cracks even for components that require considerable strength. Those filler alloys, however, are not usually commercially available, and hence are costly and the process is not easy to implement.

BRIEF DESCRIPTION OF THE DRAWINGS

The invention is explained in the following description in view of the drawings that show.

DETAILED DESCRIPTION OF THE INVENTION

Figures 1, 2, 3:
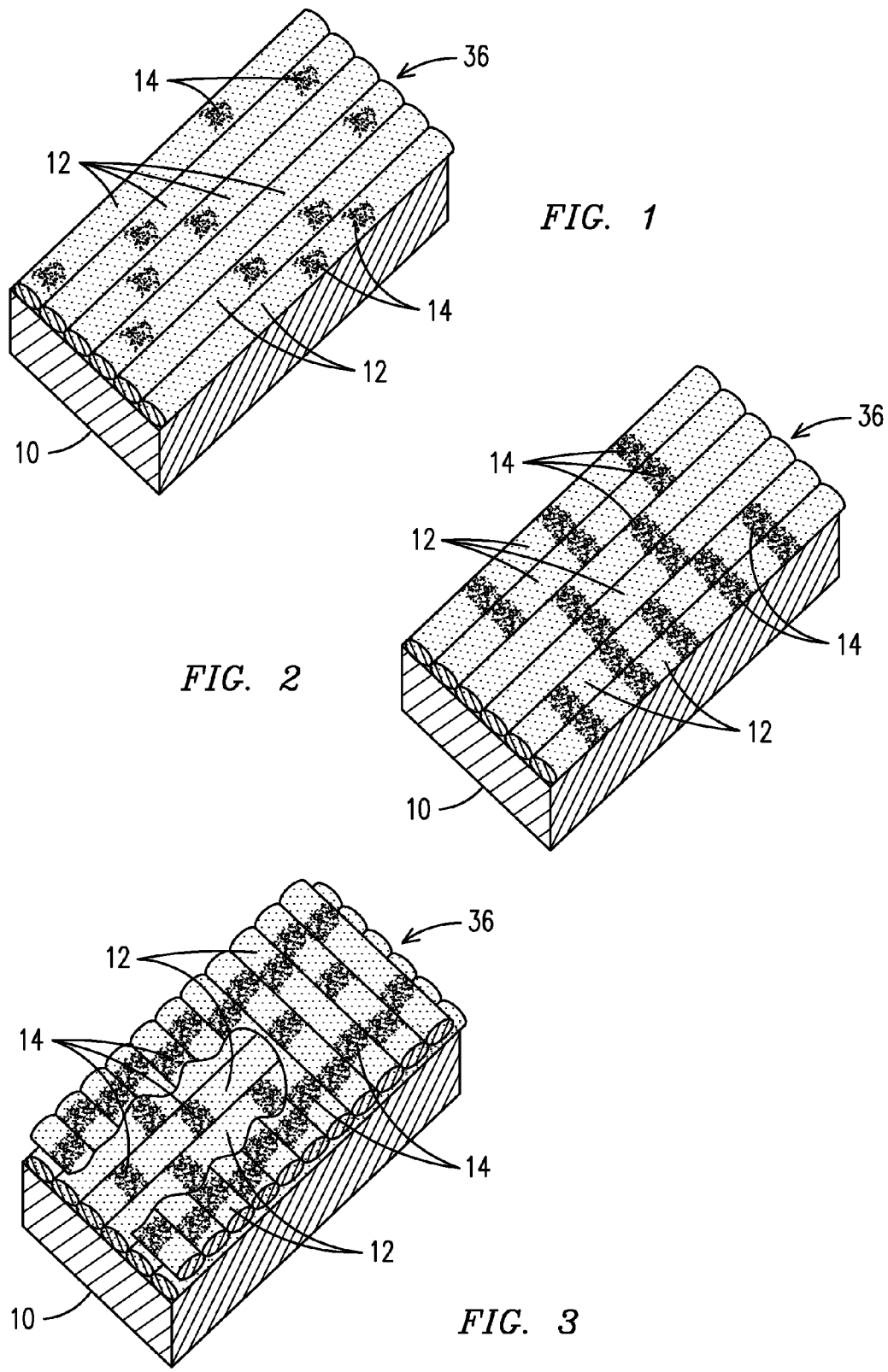
FIG. 1 is a perspective view of a substrate with weld beads of first and second material, including stress propagation mitigation regions disposed randomly throughout the weld bead.
FIG. 2 is a perspective view of a substrate with weld beads of first and second material, including stress propagation mitigation regions disposed periodically throughout the weld bead.
FIG. 3 is a perspective view of a substrate with two continuous layers of weld beads of FIG. 2.

The inventors of the present invention have recognized a need for an advanced turbine repair method that provides weld build-ups on gamma-prime-strengthened nickel based superalloy components where the strength of the weld build-up is comparable to that of the gamma-prime-strengthened nickel based superalloy substrate, yet where the build-up forms no cracks or fewer cracks during the build-up process than would be present if the filler material and the substrate were the same material. In addition, the build-up will reduce the spread of any cracks that do form during the build-up process, or anytime thereafter, through the inclusion of crack propagation mitigation regions within the build-up itself. The crack propagation mitigation regions are formed during the weld build-up process as described below. Further, the present method is also easier to employ, and less expensive than current techniques.

The substrate of all embodiments may be, for example, INCONEL® 738, CM-247, CM-681, CM-186, both manufactured by The C-M Group, Alloy 713 manufactured by Quest4Alloys Ltd, and René® 80, and single crystals SC 180, René® N5, René® N6, both manufactured by Reade Advanced Materials, CMSX-2®, CMSX-4®, CMSX-10®, all three manufactured by the C-M Group, PWA 1480, and PWA 1484. The substrate may include elements selected from Ni, Co, Cr, Mo, W, Ta, Al, Ti, Re, Nb, Hf, C, and B. The nickel based superalloy component may contain at least 5 weight percent total of Al and Ti.

In both embodiments the filler material is also a gamma-prime-strengthened nickel based superalloy. In one embodiment, the filler material is a powder made of a first material mixed with a second material. In another embodiment, some of the welds are made of the first material and some are made of the second material. In both embodiments the first material exhibits strength and ductility comparable to the substrate when at high temperature, i.e. even-matched, and the second material exhibits ductility greater than the substrate when at high temperature, i.e. under-matched (in strength). It is noted, for clarity, that the filler material is made of a first material and a second material, and the second material may be a mixture of differing materials. The phrase "first material exhibits strength and ductility comparable to the substrate" means that the first material is a filler material that includes a total weight percentage of Al and Ti not less than 80% of the total weight percentage of Al and Ti present in the substrate. The choice of second material varies slightly for each of the two discussed embodiments, but in both embodiments the second material may be comprised of one "under-matched" material, or it may be composed of multiple "under-matched" materials. The phrase filler material/resulting filler material refers to a filler material that is a mixture of first and second materials, and when mixed the filler material has a total weight percentage of Al and Ti of 1.5% to just below 5%.

In accordance with the embodiments, a high power energy source is used to both preheat and fully melt a filler to cause shallow melting of at least a portion of a surface of a substrate which comprises a gamma-prime-strengthened nickel based superalloy. The filler is deposited onto a portion of the surface of the substrate to form a solid clad on the substrate to provide a superalloy weld. The process is repeated until multiple adjacent beads form a continuous layer on the substrate. This process of creating a continuous layer can be repeated several times, such that several layers may applied in order to reach a certain height of build-up. The high energy power source is a laser.

In one embodiment, the second material is a mix of different superalloy powders supplied by in-situ mixing. The composition of the second material is chosen based on the composition of the substrate and desired build-up characteristics. The second material is chosen such that generally the resulting filler composition of total Al and Ti is reduced to below 5 weight percent, and preferably to 1.5 to 4.9 weight percent inclusive. The reduction of total Al and Ti content allows the filler alloy to be weldable. The second material may be made of one or more than one of the following, selected in order to reach the desired weight percent levels of Al and Ti: INCONEL®718, INCONEL® 625, Haynes® 282® manufactured by Haynes International, Hastelloy® X manufactured by Haynes International, and any other alloy powders containing Al+Ti less than 4 weight percent. The filler material may comprise any of the following elements: Ni, Co, Fe, Cr, W, Mo, Al, Si, Nb, Ti, Ta, Zr, Re, Hf, C, B, Y, and La. The weight percentage within the resulting filler material of the powder having the same or similar composition as the substrate may be in the range of 60%-90% inclusive, depending on the composition of other powders and depending on the application such as the volume that must be deposited during the repair.

The filler in the form of a powder may be fed by a feeder into the co-axial nozzle or multi-lateral nozzles. The co-axial nozzle or multi-lateral nozzle has multiple inlets. In order to mix the powder in-situ, multiple powder feed machines may be used. The number of powder feeder machines depends on the number of powders that will be mixed. At least one of the inlets may be used to feed the majority powder having the same or similar composition of the substrate. Other inlets may be used to feed the other kinds of powders to adjust the composition.

Uniquely, in this embodiment the operator may vary the amount of the second material by adjusting the powder feed rates. As a result, the operator can create areas within the weld bead where the concentration of the second material, the under-matched material, is increased with respect to the concentration of the second material in the rest of the weld bead. Even further, the operator can vary the composition of the powders that make up the second material itself, such that the composition of the second material can vary throughout the weld bead. As a result, the operator can create areas within a bead where the amount of under-matched material is greater than in the rest of the weld bead, either by increasing the amount of second material in that region, or by increasing the percentage of a particular under-matched component that makes up the second material. Such non homogeneous regions, when filled with a greater concentration of an under matched material, form crack propagation mitigation regions, because they are more ductile than the remainder of the weld bead. This more ductile crack propagation mitigation region plays an important role in relaxation of stress or strain developed during solidification via plastic deformation, further avoiding or reducing the formation of cracks. This non-uniform application of the second material in certain regions is contrary to the uniform composition of the weld bead taught in the prior art.

As can be seen in FIG. 1, a substrate 10 has had a weld bead 12 applied. The weld bead 12 includes crack propagation mitigation regions 14 disposed randomly throughout the weld bead 12. The crack propagation mitigation regions 14 need not extend evenly across a cross section of the bead. In fact, the crack propagation mitigation regions 14 can be significantly smaller in rough diameter than a diameter of the weld bead, such that a crack propagation mitigation regions 14 may only take up a portion of a cross section of the weld bead. The crack propagation mitigation regions 14 can be random throughout the weld bead, as seen here, or can be more periodic, as shown in FIG. 2. Further, crack propagation mitigation regions 14 in adjacent weld beads may or may not align with each other, as is also shown in FIG. 2. Despite only showing two variations in these figures, any number of variations in the placement of the stress mitigation propagation regions can be envisioned, and are intended to be within the scope of this disclosure. Each weld bead is repeated to form a single continuous layer 36.

Further, additional continuous layers can be applied until a desired build-up height is reached, as can be seen in FIG. 3. These layers may all have the same thickness, or may have differing thicknesses. Thinner layers may have an advantage in that cracks propagating from one layer to another may more quickly encounter a crack propagation mitigation region, thereby preventing the crack from growing larger. Layers can be very thin. For example, micro-cladding with very low laser power (100-200 W) can produce a layer which is approximately 0.1-0.2 mm thick. Micro-cladding can be applied to all embodiments.

In another embodiment, the first material again exhibits strength and ductility comparable to the substrate when at high temperature, and the second material exhibits ductility greater than the substrate when at high temperature. In this embodiment, the composition of the second material is also chosen based on the composition of the substrate and desired build-up characteristics. Materials that may be used for the second material may contain Al+Ti less than 5 weight percent, and may preferably contain less than 4 weight percent. The second material may be made of one or more of the following, selected in order to reach the desired weight percent levels of Al and Ti: INCONEL® 718, INCONEL® 625, Haynes® 282®, Hastelloy® X, and any other powders containing Al+Ti less than 4 weight percent. The filler material may comprise any of the following elements: Ni, Co, Fe, Cr, W, Mo, Al, Si, Nb, Ti, Ta, Zr, Re, Hf, C, B, Y, and La. The selection of second group material is based on the requirement of strength in the repaired region. For example, if INCONEL® 625 or Hastelloy® X solution strengthened alloys are not structurally acceptable, an under matched (lower strength than the base alloy) precipitation strengthened alloy exhibiting a ductility higher than that of the base alloy material may be used, such as René® 41 or Haynes® 282®.

Unlike the first described embodiment, in this embodiment the first material and the second material are deposited individually and separately onto the substrate. In one variation of this embodiment the first and second weld beads are both present in a continuous layer. In another variation of this embodiment, a continuous layer may be composed of either a first material only or a second material only.

In the first variation of this embodiment the first material may first be deposited onto the substrate to form beads with a predetermined space between the beads. The second material may then be deposited into the predetermined space between the first material beads such that once completed, the first material beads and second material beads form a continuous layer on the substrate. Alternately, instead of applying first material weld beads and then filling in the space in between with second material weld beads, a first material weld bead can be applied and then the second material can be deposited beside the first material bead with a predetermined off-set distance. This can be repeated several times to form a continuous layer. The process of creating a continuous layer can itself be repeated several times, such that several layers may be applied in order to reach a certain height of build-up. Further, the laser build up height and width can be enlarged using parallel and overlapped weld beads.

The inventive method produces a weld build-up with composite structure characteristics in which the beads made with the first powder provide high elevated temperature strength of the deposit, whereas the beads made with the second powder provide a degree of flexibility in the weld that serves to mitigate the stresses induced by welding, thereby preventing the initiation of cracks associated with laser deposition using a single alloy powder having the same or similar composition as the superalloy components.

Figure 4:
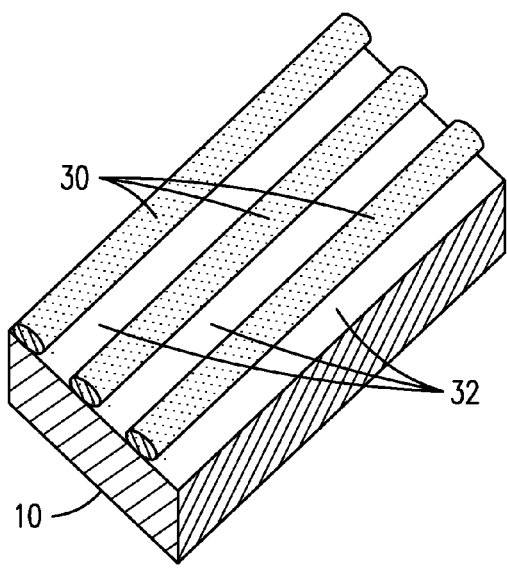
FIG. 4 is a perspective view of a substrate with first material weld beads.
Figure 5:
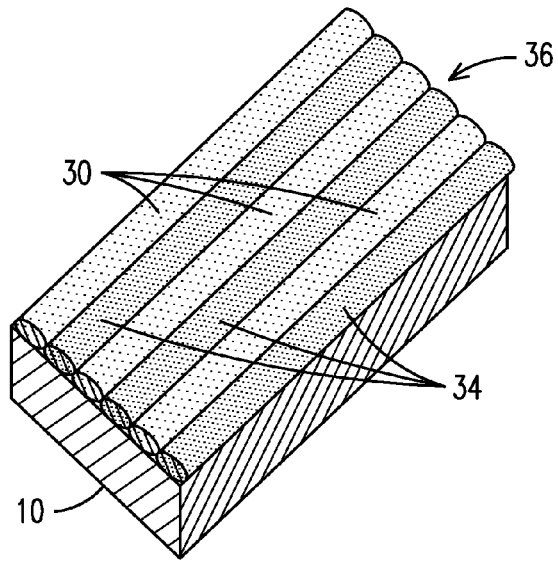
FIG. 5 is a perspective view of the substrate and first material weld beads of FIG. 3, with second material weld beads.
Figure 6:
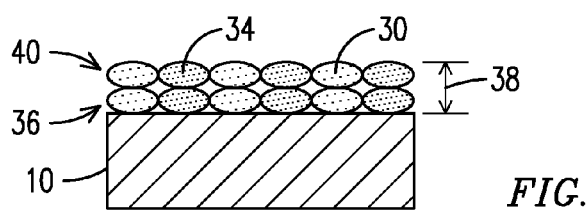
FIG. 6 is an end view of the substrate and first and second material weld beads of FIG. 4, with a second continuous layer where the weld beads of like material align.
Figure 7:
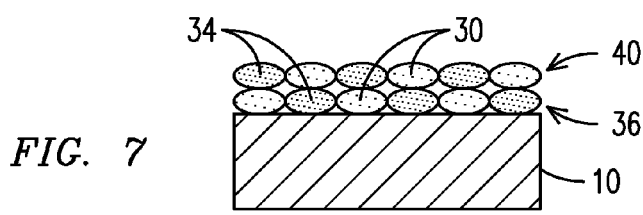
FIG. 7 is an end view of the substrate and first and second material weld beads of FIG. 4, with a second continuous layer where the weld beads of like material are staggered.
Figure 8:
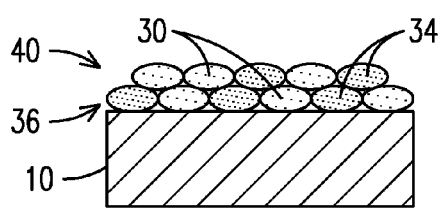
FIG. 8 is an end view of a substrate and first and second material weld beads in a non-alternating pattern in the first continuous layer, with a second continuous layer ith first and second material weld beads that do not alternate and do not align with the adjacent layer.
Figure 9:
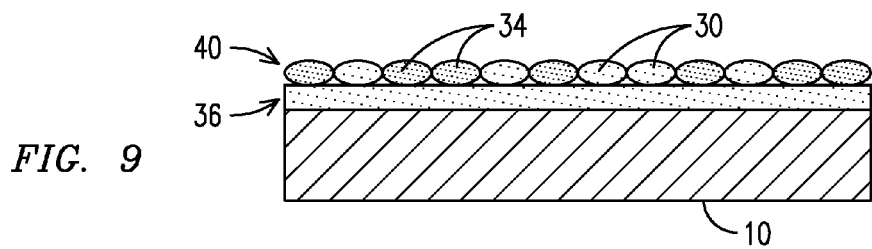
FIG. 9 is a side view of a substrate with a first and second continuous layer applied, where weld beads in the second continuous layer are perpendicular to the weld beads of the first continuous layer.

As can be seen in FIG. 4, a substrate 10 has had a plurality of first material weld beads 30 applied in accord with an embodiment of the invention. Between the first material weld beads are predetermined spaces 32 into which second material weld beads 34 are deposited, as shown in FIG. 5. Together the first material weld beads 30 and second material weld beads 34 form a continuous layer 36. As seen in FIG. 6, which is an end view of the substrate 10 with two continuous layers 36, 40 applied, multiple continuous layers 36, 40 can be applied until a desired height 38 and/or geometry are reached. Further, the pattern and/or ratio of first material weld beads 30 and second material weld beads 34 in the second continuous layer 40 and additional continuous layers may or may not match the pattern and/or ratio of first material weld beads 30 and second weld beads 34 in the first continuous layer 36. For example, the first material weld beads 30 in the second continuous layer 40 may be above first material weld beads 30 in the first continuous layer 36, as seen in FIG. 6, or may be above second material weld beads 34 in the first continuous layer 36, as seen in FIG. 7, or some of the first material weld beads 30 in the second continuous layer 40 may be above both first material weld beads 30 and second material weld beads 34 in an the first continuous layer 36, i.e. a more random pattern, as can be seen in FIG. 8. The same applies to second material weld beads 34 in the second continuous layer 40. As can be understood, the patterns may vary from layer to layer. Even further, the weld beads of one layer need not be parallel to the weld beads of another layer, as can be seen in FIG. 9, which is a side view of the substrate 10, in which one weld bead of the first continuous layer 36 can be seen, as can be the perpendicular weld beads of the second continuous layer 40. Both layers can have first material weld beads in any pattern, or a non repetitive pattern. Weld beads from one layer to the next may be perpendicular, parallel, or at any angle to the weld beads of an adjacent layer. The inventors envision embodiments where weld beads of one layer are not parallel. Also envisioned are subsequent layers where the weld beads are not parallel to each other and do not match the weld beads of adjacent layers. In other words, the pattern, direction, and composition of weld beads in one layer are independent of the pattern, direction, and composition of the weld beads in adjacent layers. Any number of variations in the placement of the first and second material weld beads can be envisioned, and are intended to be within the scope of this disclosure.

Figure 10:
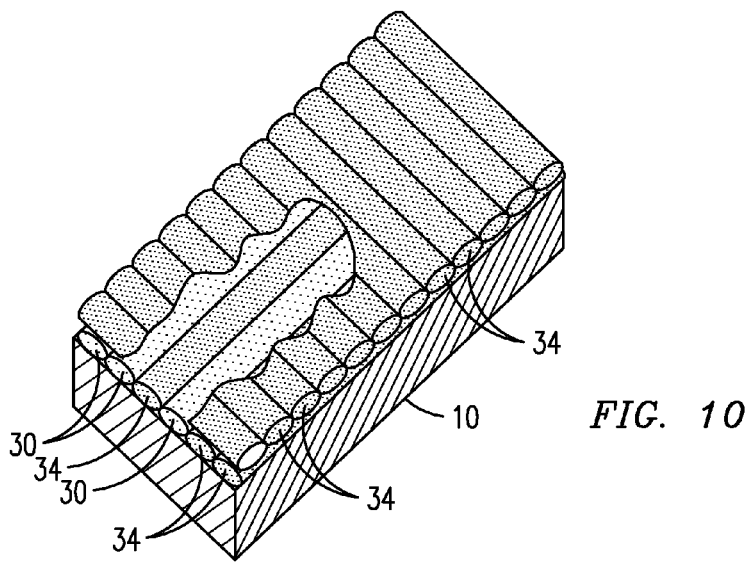
FIG. 10 is a perspective view of a substrate with two continuous layers of weld bead, where one of the layers is composed entirely welds beads of a single material.

In a second variation of this embodiment, a continuous layer of material may be formed entirely of the first material, or entirely of the second material, as can be seen in FIG. 10. For example, a first layer is formed in any manner disclosed above. A second crack propagation mitigation layer may be formed of weld beads composed entirely of the second material. Additional layers may then be formed using any of the disclosed methods. An advantage of this method is that cracks forming in one layer that may propagate to another layer will not be able to avoid the second material when the encountered layer is entirely composed of the second material. Consequently, cracks of this nature will not propagate as far. As above, these layers may all have the same thickness, or may have differing thicknesses. Thinner layers may have an advantage in that cracks propagating from one layer to another may more quickly encounter a crack propagation mitigation region, thereby preventing the crack from growing larger. Layers can be very thin. For example, micro-cladding with very low laser power (100-200 W) can produce a layer which is approximately 0.1-0.2 mm thick. Micro-cladding can be applied to all embodiments.

In both embodiments, the relative motion of the beam of the high energy power source may be at a speed of about 2-22 inches per minute relative to the adjacent portion of the surface of the partially melted substrate. Preferably, the relative motion of the beam of the high energy power source may be at a speed of about 2-11 inches per minute relative to the adjacent portion of the surface of the partially melted substrate. The high energy power source may be a laser. In particular it may be a carbon dioxide, Nd:YAG, diode disc, or fiber laser. The laser may typically have a power of about 50-2500 watts. Preferably the laser may have a power of about 150-1500 watts. The laser may produce a laser-welded clad bead having a width of about 0.02-0.1 inches. Preferably, the laser may produce a laser-welded clad bead having a width of about 0.02-0.06 inches.

The powder may be fed by the powder feeder at a rate of about 0.1-20 grams per minute. Preferably, the powder may be fed at a rate of about 0.1-10 grams per minute. Alternately, the filler may be in the form of a wire, or a combination of wire and powder. The filler and portion of the substrate are shrouded with an shielding gas, such as Ar, $Ar+H_2$, $Ar+N_2$, Ar+He, He and rapid relative motion of the beam of the high power energy source to an adjacent portion of the surface of the substrate allows a solid clad to form. By controlling energy output, welding speed, and powder feed rate the solidification rate is controlled, providing the desired directional solidification in the weld build-up. Preferably, the process is carried out in a protected, inert gas shielded atmosphere, at an ambient temperature. As the components do not need to be heated while welding, the process is more easily carried out in production applications. When the component is heated during welding the process becomes more difficult, (see U.S. Pat. Nos. 5,106,010, 6,037,563, 6,024,792, and EP 0861927), and the components as well as the microstructure can be detrimentally affected. By avoiding heating of the components the process is production friendly, saves time by avoiding heat ramp-up, stabilization, and cool down periods, and provides cost savings as a heating unit and heat control operations are not required.

Example 1

A CM-247 nickel base superalloy was laser powder welded at room temperature using mixed powers of Mar-M-247® powder (−140+325 Mesh), INCONEL® 718 powder (−140+325 Mesh) and Haynes® 282® powder (−140+325 Mesh).

Depositions were carried out with a fiber-coupled continuous wavelength high power diode laser (HPDL) (Laserline, max. power output 3 kW), focused by a 200 mm focal length lens. The work distance was set to produce a spot size of 1.2 mm diameter. Powders were supplied by a coaxial powder injection nozzle with a powder focal distance of 8 mm. Two powder feeders were used to deliver Mar-M-247® and INCONEL®718 powders by Ar with a flow rate of 4 liters/min at pressure of 75 psi. A mixed gas of Ar+5% $H_2$ with a flow rate of 7 liters/min was used as shielding gas to prevent the substrate and cladding from oxidizing. Two of the powder feed inlets were used to feed Mar-M-247® powder at a feed rate of 0.8 grams/min and another two powder feed inlets were used to feed INCONEL® 718 powder at a feed rate of 0.25 grams/min, thus giving a weight percentage of Mar-M-247® of 76%. For comparison, 100% Mar-M-247® powder was also deposited under the same conditions.

The deposition process was carried out with a deposition movement of 3.54 IPM (90 mm/min) and a laser power of 275 Watts. The width of deposited bead was in the range of 0.02"-0.1" (0.5 mm-2.54 mm). Five adjacent beads are deposited using an off-set distance of 0.8 mm. Eight layers were deposited to produce a build-up height of 3.0 mm. The compositions of both 100% Mar-M-247® deposit and 76% Mar-M-247® deposit (24% INCONEL®718) were determined by EDX, as shown in Table 1. In 76% Mar-M-247® deposit, total Al+Ti was 4.56 wt. %, which is comparable with 5.71 wt. % in 100% Mar-M-247® deposit. (The 76% Mar-M-247®+ 24% INCONEL®718 mixture contains 80 wt. % of (Al+Ti) present in unmixed Mar-M247.) However, 100% Mar-M-247® deposit showed significant cracking in terms of total number of cracks, total length of cracks and the maximum length of individual cracks. In one 76% Mar-M-247® deposit, no crack was found, in another 76% Mar-M-247® deposit, only one micro-crack was found (Table 2).

Laser metal deposition was also carried out with the same parameters mentioned above except for mixing 48% Haynes® 282® into Mar-M-247® instead of mixing 36% INCONEL®718 into Mar-M-247®. No cracks were found in the deposits.

TABLE 1

The compositions of both 100% Mar-M-247 ® deposit and 76% Mar-M-247 ® deposit (24% INCONEL ®718) were determined by EDX (wt. %)

|  | 100% Mar-M-247 ® | 76% Mar-M-247 ® |
|---|---|---|
| Al | 4.47 | 3.35 |
| Ti | 1.25 | 1.21 |
| Cr | 8.80 | 11.00 |
| Fe | 0.00 | 4.42 |
| Co | 11.39 | 8.28 |
| Ni | 59.07 | 59.29 |
| Nb | 0.08 | 0.71 |
| Mo | 0.54 | 0.89 |
| Hf | 0.91 | 0.65 |
| Ta | 2.44 | 2.22 |
| W | 11.06 | 7.99 |

TABLE 2

Cracks within the deposits

|  | Total # of cracks | Total length (mm) | Max. length (mm) |
|---|---|---|---|
| 100% Mar-M-247 ® | 35 | 14.6 | 1.49 |
| 76% Mar-M-247 ® | 1 | 0.36 | 0.36 |
| 76% Mar-M-247 ® | 0 | 0 | 0 |

The specimens for tensile test were prepared by depositing either Mar-M-247®+36% INCONEL® 718 powders or Mar-M-247®+48% Haynes® 282® powder into a pre-machined groove. Depositions were carried out using laser power of 275 W at a scanning speed of 1.5 mm/s. After deposition, the specimens were heat treated as follows: solution heat treatment at 2150 F for 4 hours, precipitation heat treat at 1950 F for 4 hours and aging heat treat at 1600 F for 24 hours. Tensile tests were carried out at 1600 F in air according to ASTM E8 and ASTM E21. The results are shown in Table 3. Compared with the mechanical properties of base metal CM-247, the yield strength and tensile strength recorded during the initial test of deposit made with Mar-M-247® mixed with 36% INCONEL® 718 powders were 87.5 ksi and 102 ksi respectively, which are 79% and 87% of the base material. In addition, the ductility (elongation, 5%) of the weld was very close to that of the base material (elongation 6%). Similarly, the laser weld made with Mar-M-247® mixed with 48% Haynes® 282® showed 67.5 ksi yield strength and 106 ksi tensile strength, which are 61% and 91% of the base material respectively. In Table 3, tensile properties of superalloy INCONEL® 625, René® 41, Haynes® 282®, INCONEL® 939, INCONEL® 738 and INCONEL® 738/INCONEL® 939 joint are also listed for comparison. The results demonstrated that laser powder deposited welds via an in-situ powder mixing process of this invention are superior to INCONEL® 625, René® 41, Haynes® 282® and INCONEL® 939 as well as INCONEL® 738/INCONEL® 939 joint.

TABLE 3

High temperature (1600 F.) tensile properties of laser deposit and base material.

|  | Heated Treatment | YS (ksi) | TS (ksi) | El. (%) | RA (%) | Fractured at |  |
|---|---|---|---|---|---|---|---|
| CM-247/(M-247 + 36% INCONEL ®718) joint | S + A | 87.5 | 102 | 5 | 11 | Weld | Tested |
| CM-247/(M-247 + 48% Haynes ® 282 ®) joint | S + A | 67.5 | 106 | 4 | 4 | Weld | Tested |
| CM-247 base metal | S + A | 111 | 117 | 6 | 41 |  | Tested |
| INCONEL ®625 base metal | Annealed | 40 | 40 | 125 |  |  | Reference* |
| René ® 41 base metal | S + A | 80 | 90 | 19 |  |  | Reference* |
| Haynes ® 282 ®base metal | S + A | 73.6 | 82.1 | 31 |  |  | Reference* |
| INCONEL ® 939 base metal | S + A | 58 | 93 | 18 |  |  | Reference* |
| INCONEL ®738 base metal | S + A | 80 | 112 | 11 |  |  | Reference* |
| INCONEL ®738/INCONEL ® 939 joint | S + A | 59.7 | 102.8 | 2.8 | 1.6 |  | Reference* |

*[David W. Gandy, EPRI RRAC, Fourth International EPRI Conference, *Welding and Repair Technology for Power Plants*, Jun. 7-9, 2000, Marriott's Marco Island Resort and Golf Club Naples, Florida, USA] anneal
Heat treatment: S + A solution + aging.

Example 2

An overaged CM 247 nickel base superalloy was laser powder welded at room temperature using intermixed depositions with Mar-M-247® powder (−140+325 Mesh) and Haynes® 282® powder (−140+325 Mesh), respectively. For comparison, single Mar-M-247® powder as well as single Haynes® 282® powder were also deposited at the same conditions.

Depositions were carried out with a fiber-coupled continuous wavelength high power diode laser (HPDL) (Laserline, max. power output 3 kW), focused by a 200 mm focal length lens. The work distance was set to produce a spot size of 1.2 mm diameter. Powders were supplied by a coaxial powder injection nozzle with a powder focal distance of 8 mm. Two powder feeders-were used individually to deliver Mar-M-247® powder and Haynes® 282® powder respectively to produce intermixed deposit by Ar with a flow rate of 4 liter/min at a pressure of 75 psi. A mixed gas of Ar+5% $H_2$ with a flow rate of 6 liter/min was used as shielding gas to prevent the substrate and cladding from oxidation. For comparison, single Mar-M-247® powder was also deposited under the same conditions.

The deposition process was carried out with a deposition movement of 3.54 IPM (90 mm/min) and a laser power of 275 Watts. The width of deposited bead was in the range of 0.02 to 0.1 inches (0.5 to 2.54 mm). Five beads with a space of 0.8 mm are deposited into the spaces with Haynes® 282® powder to form the first layer. Eight layers were deposited in the same manner to produce a build-up height of 3.0 mm.

Figure 11:
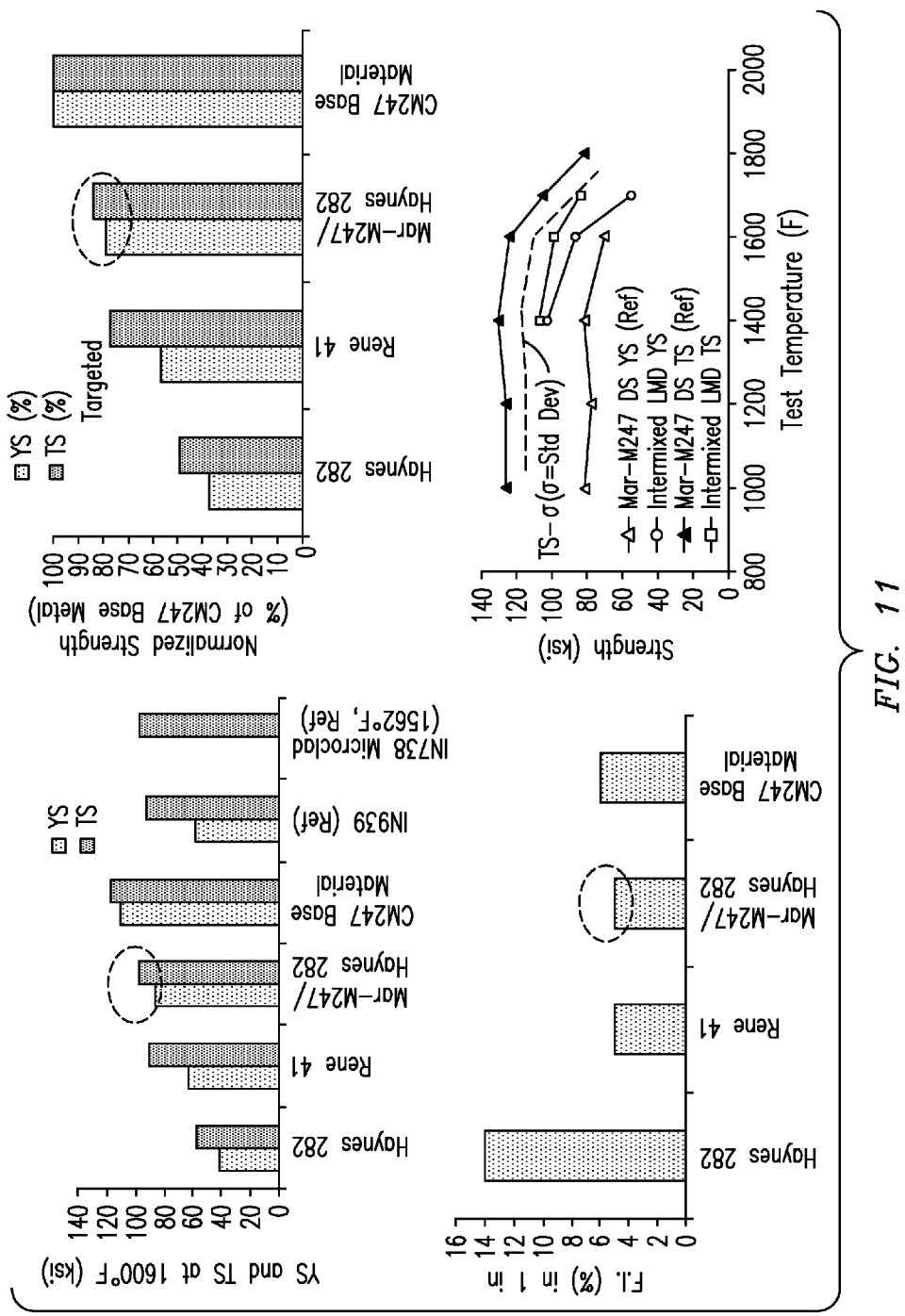
FIG. 11 shows results from tensile tests which were carried out from 1400 F to 1700 F in air according to ASTM E8 and ASTM E21 using specimens that were prepared by intermix depositing with Mar-M-247® powder and Haynes® 282® powder into a pre-machined groove.

The specimens for tensile test were prepared by intermix depositing with Mar-M-247® powder and Haynes® 282® powder into a pre-machined groove. Depositions were Carried out using laser power of 275 W at a scanning speed of 1.5 mm/s. After deposition, the specimens were heat treated as follows: solution heat treatment at 2150 F for 4 hours, precipitation heat treat at 1950 F for 4 hours and aging heat treat at 1600 F for 24 hours. Tensile tests were carried out from 1400 F to 1700 F in air according to ASTM E8 and ASTM E21. The results are shown in Table 4 and FIG. 11. Compared with the mechanical properties of base metal CM-247, the yield strength and tensile strength recorded during the initial test of the intermixed deposit made with Mar-M-247® powder and Haynes® 282® powder were 86.5 ksi and 98 ksi respectively, which are 79% and 83% of the base material. In addition, the ductility (elongation, 5%) of the intermixed weld was very close to that of the base material (elongation 6%). Furthermore, the tensile properties of the intermixed weld are superior to those of René® 41 weld and INCONEL® 939 weld. Table 5 shows the tensile properties of the intermixed weld from 1400 F to 1700 F.

TABLE 4

Tensile properties tested at 1600 F.

|  | YS (ksi) | TS (ksi) | El. In 1 in (%) |
|---|---|---|---|
| Haynes ® 282 ® (weld) | 41.4 | 57.5 | 14 |
| René ® 41 (weld) | 63.5 | 90 | 5 |
| Mar-M-247 ®/Haynes ® 282 ® (intermixed weld) | 86.5 | 98 | 5 |
| INCONEL ® 939 (weld, Ref [1]) | 58 | 93 | 3 |
| CM-247 (base material) | 111 | 117 | 6 |

TABLE 5

Tensile properties of intermixed weld tested at 1400 to 1700 F.

| Test temperature (F.) | YS (ksi) | TS (ksi) |
|---|---|---|
| 1400 | 103 | 106 |
| 1600 | 86.5 | 98 |
| 1700 | 54.5 | 83 |

Figure 12:
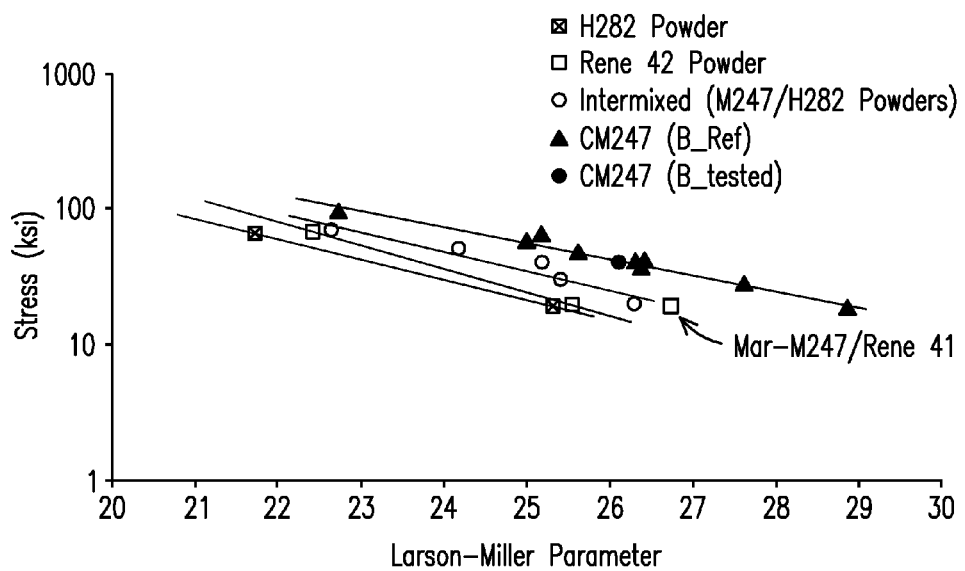
FIG. 12 shows stress rupture properties of different alloy welds.

Table 6 and FIG. 12 show the stress rupture properties of different alloy welds. The intermixed weld showed superior rupture life than Haynes® 282® and Rene 41. In another embodiment, René® 41 was used instead of Haynes® 282® to produce a Mar-M-247®/René® 41 intermixed weld, which gave longer life than that of Mar-M-247®/Haynes®282® intermixed weld.

TABLE 6

Stress rupture property of intermixed deposit

| Temperature (F.) | (C.) | (K) | Stress (ksi) | Time of rupture (h) |
|---|---|---|---|---|
| 1400 | 760 | 1033 | 70 | 85 |
| 1500 | 816 | 1089 | 50 | 158 |
| 1600 | 871 | 1144 | 40 | 103.7 |
| 1700 | 927 | 1200 | 30 | 14.9 |
| 1700 | 927 | 1200 | 20 | 81.36 |

It can be seen that the present invention provides a way to improve weld strength for gamma-prime-strengthened nickel based superalloys used in gas turbines by reducing crack formation and propagation through the introduction of crack mitigation regions within the continuous layers of the weld build-up. The invention will permit repair to both dimension and structure of the components using readily available materials that can be mixed on site, and the repair can be performed at ambient temperature. The present invention repairs may be less expensive than prior methods and yet it more flexible in that the mixture of the filler material can be adjusted during the repair operation, and as a result the filler material can be adjusted to suit requirements. Further, crack mitigation regions can be created in the continuous layer through variation of feed rates for the first and second materials, and through variation of the percentages of material in the second material. Consequently, this invention represents a substantial improvement over the prior method known in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of welding a gas turbine engine substrate composed of a gamma prime precipitation strengthened nickel based superalloy, the method comprising:
   applying weld beads to a surface of the substrate to form a continuous layer of weld beads, where each weld bead of the continuous layer touches the surface of the substrate, using a filler material comprising a first material exhibiting comparable strength and ductility as the substrate and a second material exhibiting greater ductility than the substrate; and
   creating a plurality of crack propagation mitigating regions within the continuous layer, each crack propagation region defined by an increased percentage of the second material when compared to a percentage of the second material in a remainder of the continuous layer.

2. The method of claim 1, further comprising:
applying first material weld beads to the substrate, leaving at least one space between two adjacent first material weld beads; and
applying at least one second material weld bead to the substrate into the at least one space, thereby forming the continuous layer.

3. The method of claim 2, comprising applying 0.02"-0.1" (0.5 mm-2.54 mm) wide first material weld beads.

4. The method of claim 2, wherein first material weld beads are adjacent second material weld beads in the continuous layer.

5. The method of claim 2, wherein at least one weld bead is adjacent another weld bead made of the same material.

6. The method of claim 2, further comprising creating additional continuous layers to reach a predetermined build-up height.

7. The method of claim 6, wherein first material weld beads in at least two adjacent continuous layers align.

8. The method of claim 6, wherein first material weld beads in at least two adjacent continuous layers do not align.

9. The method of claim 6, wherein first material weld beads in a continuous layers aligns with second material weld beads in an adjacent layer.

10. The method of claim 6, wherein the weld beads in at least two adjacent continuous layers are not parallel.

11. The method of claim 1, further comprising:
applying weld beads wherein each weld bead comprises both first and second materials; and
increasing the percentage of the second material at the crack propagation mitigating regions within each weld bead.

12. The method of claim 11, further comprising:
using a welder with multiple material delivery nozzles; and
varying material delivery rates during application of the weld bead.

13. The method of claim 11, further comprising:
applying weld beads wherein each weld bead comprises both the first and second materials, wherein an amount of the first material in the weld bead is greater than an amount of the second material.

14. The method of claim 13, further comprising:
applying weld beads wherein each weld bead comprises both the first and second materials, wherein the weld bead comprises 60%-90% by weight of the first material.

15. The method of claim 11, further comprising applying 0.02"-0.1" (0.5 mm-2.54 mm) wide weld beads.

16. The method of claim 15, further comprising applying 0.04"-0.06" (1 mm-1.5 mm) wide weld beads.

17. The method of claim 11, further comprising creating additional continuous layers to reach a predetermined build-up height.

18. The method of claim 17, wherein the weld beads in at least two adjacent continuous layers are parallel.

19. The method of claim 17, wherein the weld beads in at least two adjacent continuous layers are not parallel.

20. The method of claim 1, wherein:
applying weld beads further comprises:
applying weld beads on the substrate to form a continuous layer using laser metal deposition, and
wherein using a filler material further comprises:
using a first material in at least one of a forms selected from the group consisting of powder and wire; and
using a second material in at least one of the forms selected from the group consisting of powder and wire.

21. The method of claim 1, further comprising:
heat treating the welded substrate using at least one of the heat treatments in the group consisting of solution, precipitation, and aging.

22. The method of claim 1, wherein the gamma prime precipitation strengthened nickel based superalloy substrate comprises at least 5% by weight total of Al and Ti, and wherein using a filler material further comprises:
using a filler material comprising a first material comprising a total weight percentage of Al and Ti not less than 80% of the total weight percentage of Al and Ti present in the substrate, and a second material with properties such that a resulting filler material comprises a total weight percentage of Al and Ti of 4.9% or less, wherein the second material comprises a total weight percentage of Al and Ti less than the total weight percentage of Al and Ti of the first material.

23. The method of claim 22, wherein using a filler material further comprises:
using a second material that comprises a total weight percentage of Al and Ti less than 80% of the total weight percentage of Al and Ti present in the substrate.

24. The method of claim 22, wherein the resulting filler material comprises a total weight percentage of Al and Ti from 1.5 to 4.9% of the total weight percentage of Al and Ti present in the substrate.

25. The method of claim 1, further comprising creating additional continuous layers overlying the continuous layer applied to the surface of the substrate to reach a predetermined build-up height, wherein weld beads of each respective additional continuous layer touch a same respective underlying continuous layer, and wherein each additional continuous layer comprises a plurality of crack propagation mitigation regions.

26. The method of claim 25, further comprising creating at least one crack propagation mitigation layer within the build-up composed entirely of weld bead of the second material.

27. The method of claim 6, further comprising creating at least one crack propagation mitigation layer within the build-up composed entirely of weld bead of the second material.

* * * * *